United States Patent [19]

Frejborg

[11] Patent Number: 4,918,807
[45] Date of Patent: Apr. 24, 1990

[54] SCREEN AND METHOD OF MANUFACTURE

[75] Inventor: Frey A. Frejborg, Glens Falls, N.Y.

[73] Assignee: A. Ahlstrom Corporation, Karhula, Finland

[21] Appl. No.: 259,816

[22] Filed: Oct. 19, 1988

[51] Int. Cl.$^5$ .............................................. B23P 15/16
[52] U.S. Cl. ................................. 29/163.8; 29/558; 209/397; 210/498
[58] Field of Search .................... 29/557, 558, 163.6, 29/163.7, 163.8; 209/273, 397; 210/498, 415

[56] References Cited

U.S. PATENT DOCUMENTS

| | | | |
|---|---|---|---|
| 2,134,146 | 10/1938 | Raisch | 29/163.6 |
| 2,185,999 | 1/1940 | Johnson | 29/163.7 X |
| 2,792,122 | 5/1957 | Munch et al. | 210/498 X |
| 4,259,136 | 3/1981 | Spiewok | 29/163.8 X |
| 4,276,159 | 6/1981 | Lehman | 209/273 |
| 4,358,370 | 11/1982 | Jameson et al. | 210/498 X |
| 4,473,466 | 9/1984 | Schmidt et al. | 210/498 X |
| 4,486,934 | 12/1984 | Reed | 29/163.6 |
| 4,529,520 | 7/1985 | Lampenius | 209/397 |
| 4,571,298 | 2/1986 | Holz | 210/498 |

FOREIGN PATENT DOCUMENTS 2073621 10/1981 United Kingdom ............... 29/163.8

Primary Examiner—Charlie T. Moon
Attorney, Agent, or Firm—Nixon & Vanderhye

[57] ABSTRACT

A plurality of blind openings (e.g. holes or slots) are formed through a first face of a steel plate and extend a predetermined distance short of the opposite face. Larger size openings are formed through the first face using the blind openings as pilot openings. The larger size openings extend into the plate short of the terminations of the blind openings. Metal is machined from the opposite face in parallel rows defining grooves and to a depth to uncover the terminations of the blind openings in the plate body thereby providing through-extending screen openings in the plate. The ridges (bars) between the grooves may be quadrate in cross-section, or a side face sloped (angled) by machining. A screen cylinder with bars of the invention has a maximum screen area (compared to prior art screens with bars).

16 Claims, 3 Drawing Sheets

SCREEN AND METHOD OF MANUFACTURE

BACKGROUND AND SUMMARY OF THE INVENTION

The present invention relates to methods for manufacturing screen cylinders and flat screen plates for use, for example, in the pulp and paper industry for screening pulps and to the cylindrical and flat screens formed thereby.

In the formation of paper products from pulp, the pulp is screened such that impurities, such as sticks and other undesirable pulp constituents, are removed. This screening process effectively separates the accept and reject portions of the pulp. Screening is generally performed on flat plates or screen cylinders, each of which is provided with openings therethrough for separating the accept and reject portions of the pulp.

In many such screens, whether flat or cylindrical, alternating grooves and ridges are provided in one of the surfaces of the screen. For example, see U.S. Pat. No. 4,529,520. These ridges and grooves are provided for adjusting the flow characteristics of the pulp passing through the screen. While these grooves and ridges have proven to be highly desirable, screens and cylinders with such surface configurations have not heretofore been readily and easily manufactured. For example, such screens are frequently formed by first providing a plurality of openings through a flat metal plate. A plurality of bars are then secured to the plate at longitudinally spaced positions therealong in parallel alignment one with the other to form the ridges and the grooves therebetween. Particularly, the bars are conventionally welded along their opposite sides to the surface of the plate. The fabrication time and, hence, the cost of manufacture of screen plates of this type is quite substantial. Additionally, and importantly, the welds on the opposite sides of the bars occupy substantial space on the surface of the plate. The apertures through the plate are therefore oftentimes blocked by the welds and the number of screen apertures, holes or slots, is accordingly diminished. Welds along the bars also causes stress risers in the screen plate which is subject to heavy vibrations caused by high frequency pulses. Stress cracks and premature failures have often been noticed in the described areas.

It will be appreciated that it is not simply a matter of increasing the number of apertures through the screen to compensate for such reduced numbers because predetermined spacings between the apertures, holes or slots must be maintained to avoid the stapling phenomena which clogs the screen plate. Consequently, there has been demonstrated a need for a method of manufacturing screen plates of this type for use in the pulp and paper industry wherein substantial reductions in cost and manufacturing time can be achieved, as well as providing screen plates, in both flat or cylindrical form, which are effective to screen pulp with increased efficiency and capacity.

Therefore, in accordance with the present invention, there is provided a method of manufacturing a metal screen plate wherein manufacturing costs and fabrication times are greatly reduced in comparison with prior art methods of forming similar-type plates. Particularly, the present invention provides a plate having an initial thickness corresponding to the full thickness dimension of the resulting plate, including the ridges. To form the screen apertures, blind holes or slots are formed through one face of the plate to a predetermined depth short of the opposite face of the plate. These apertures are formed at longitudinally and transversely spaced locations along the plate. Larger diameter concentric holes are then formed using the smaller diameter holes as pilot holes. These larger diameter holes are provided similarly to a predetermined depth but less than the predetermined depth of the smaller diameter holes. The opposite face of the plate is then machined to form longitudinally extending rows of grooves with ridges (bars) therebetween. Thus, the opposite face is machined to remove rows of plate material to a depth to expose the termination of the smaller diameter holes in the metal plate. That is, the material on the opposite face is machined to the extent that the smaller diameter holes open through the plate but only in the areas of the rows of grooves between the ridges.

It has also been found that when producing the sizing holes by drilling the present invention creates less burrs in the holes compared to conventional drilling methods with drills "breaking-through".

In certain applications it is advantageous to angle one of the side faces of the ridges (i.e., make "profiled" bars) and this can be accomplished simply by machining the side faces of the ridges to the appropriate angle. In this manner, one side of the groove is formed by a perpendicular face of a ridge, while the opposite side of the groove is defined by an angled face of the next-adjacent ridge and which angled face extends away from the base of the slot. It will be appreciated that the number of apertures through the plate at like spacing is substantially increased in comparison with the apertures provided through similar plates of the previously described prior art construction. Additionally, the manufacturing process according to the present invention may provide for an increase in effective screen area of approximately 40% with respect to prior processes in a similarly sized plate. Further, the screen plates of the present invention may be manufactured with costs and fabrication times reduced by approximately one-half. The screen plates resulting from the foregoing-described method may be used in their flat plate configuration or may be rolled to form a screen cylinder.

In the description of the invention in the specification and claims, the term "openings" will be used throughout. This term is used for convenience only, and is intended to encompass apertures of all shapes and sizes, including holes, slots, orifices and passageways.

In a preferred embodiment of the present invention, there is provided a method of manufacturing a metal screen plate having first and second opposite faces, comprising the steps of (a) forming openings through the first face and into the body of the metal screen plate a predetermined distance to terminate within the plate body at a position P short of the second face and (b) machining the second face to remove metal material along the majority of the surface thereof to a depth to expose the position P so that the openings extend entirely through the plate body, and leave a plurality of ridges in the second face spaced one from the other therealong after machining is completed.

In a further preferred embodiment of the present invention, there is provided a method of manufacturing a screen plate having first and second opposite faces, comprising the steps of (a) forming openings through the first face and into the body of the screen plate a predetermined distance to terminate within the plate body short of the second face and (b) removing material from the second face in longitudinally extending generally parallel rows thereof along the majority of the surface thereof to a depth at least equal to the depth of the plate less said predetermined distance to form a plurality of grooves in the second face so that the openings extend entirely through the plate body and open into the grooves, but leave a plurality of ridges in the second face spaced one from the other on opposite sides of the grooves after material removal is completed.

Accordingly, it is a primary object of the present invention to provide a novel and improved method of manufacturing screen plates for use in the pulp and paper industry, and screen plates thereof, and which affords substantial reductions in the cost and fabrication time required for their manufacture in comparison with prior screen plates of similar types.

These and further objects and advantages of the present invention will become more apparent upon reference to the following specification, appended claims and drawings.

BRIEF DESCRIPTION OF THE DRAWING FIGURES

DETAILED DESCRIPTION OF THE DRAWING FIGURES

Reference will now be made in detail to the present preferred embodiment of the invention, an example of which is illustrated in the accompanying drawings.

Figure 1:
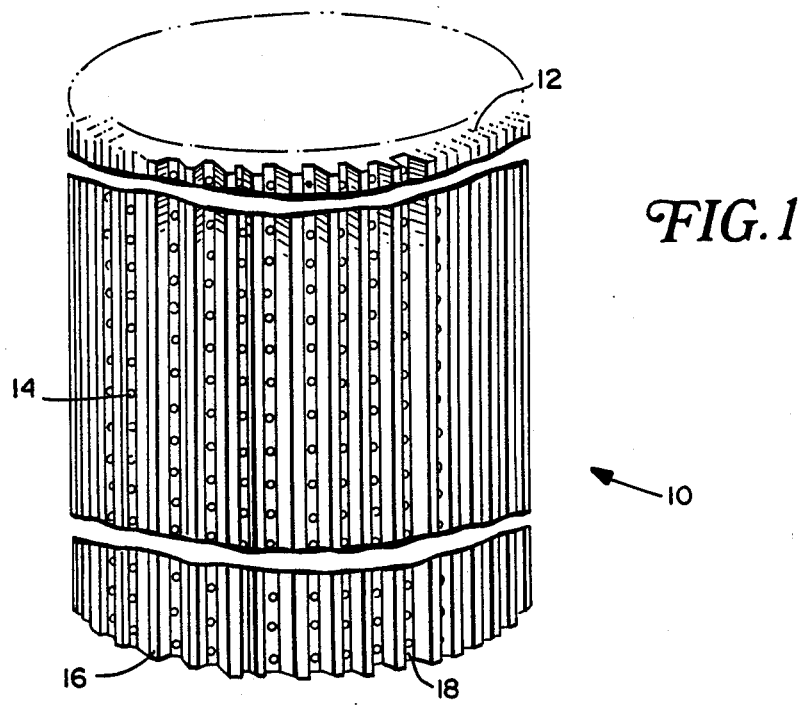
FIG. 1 is a perspective view of a screen cylinder constructed in accordance with the present invention.

Referring now to FIG. 1, there is illustrated a screen cylinder product, generally designated 10, formed in accordance with the present invention. It will be appreciated that cylinder 10 comprises a rolled metal plate 12 having a plurality of openings 14 therethrough for screening pulp. In this instance, the outside surface of the plate is provided with a plurality of generally axially extending, circumferentially spaced, ridges 16 defining axially extending slots 18 therebetween and into which grooves 18 the screen openings 14 open.

Figure 2:
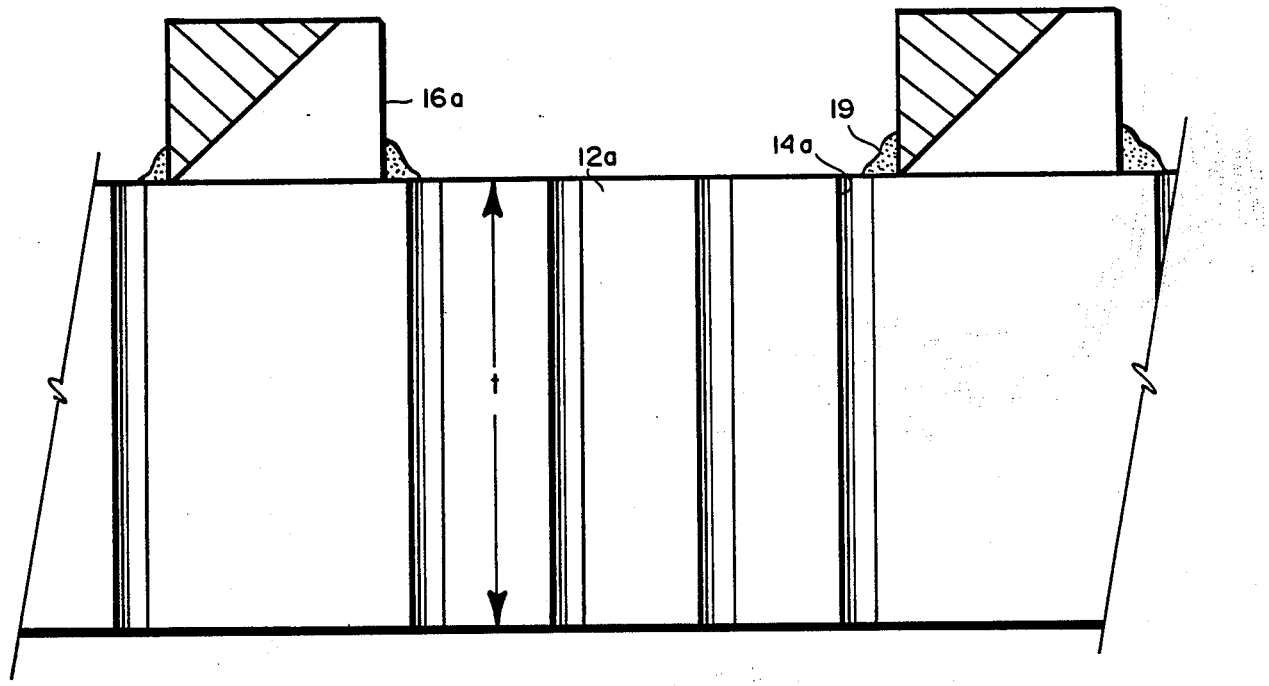
FIG. 2 is an enlarged cross-sectional view of a screen cylinder constructed in accordance with the prior art.

Referring now to FIG. 2, there is illustrated a method by which screen plates of the prior art have been made. Particularly, in that method, there is provided a screen plate 12a of predetermined thickness "t" to which a plurality of ridges or bars 16a are secured along a surface thereof Particularly, the bars 16a are secured to the surface of the plate in laterally spaced, generally parallel, relation relative to one another by welding, for example, at 19, along the bases of the bars. This is a time-consuming and laborious task. It will also be appreciated that the welds themselves have a tendency to cover, or partially cover, certain of the openings 14a through the screen plate. The flat plate 10 is, of course, rolled to form the prior art screen cylinder.

Figure 3:
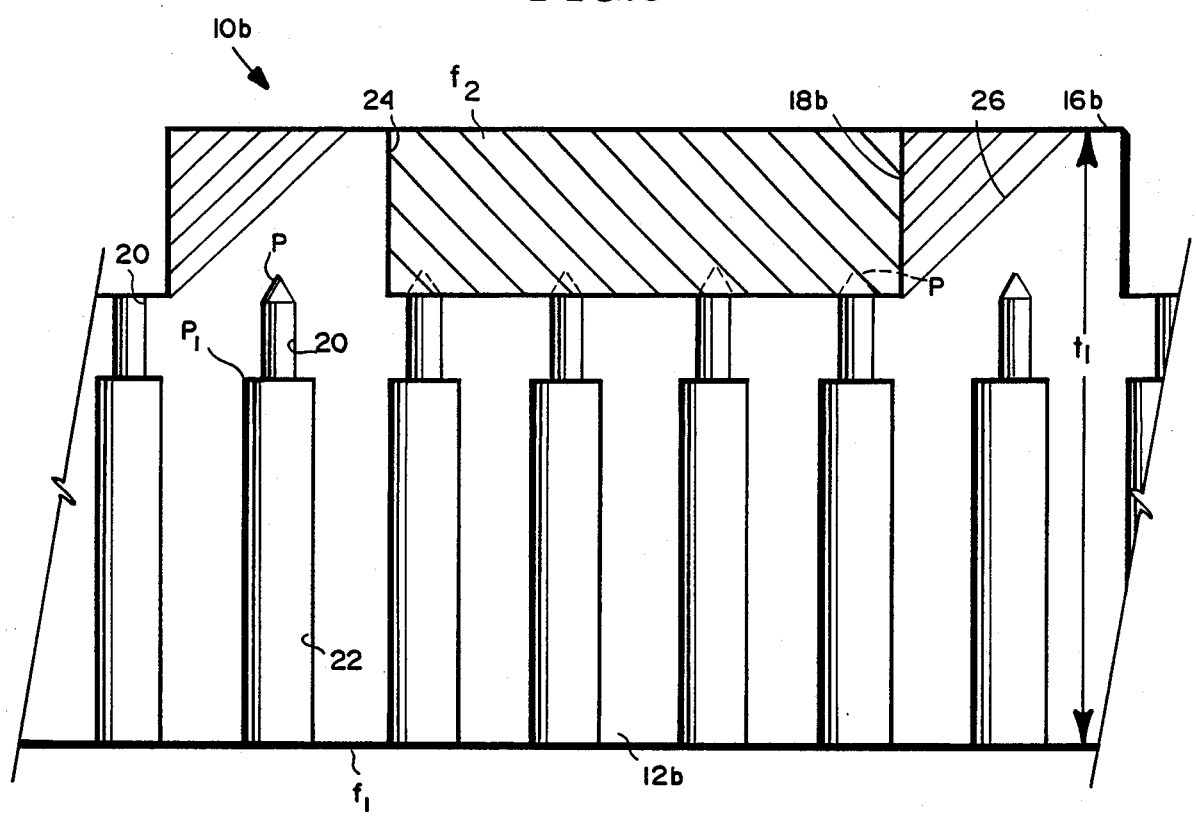
FIG. 3 is a view similar to FIG. 2 but illustrating a screen cylinder, with holes, constructed in accordance with the present invention.

Referring now to FIG. 3, there is illustrated a method of construction of a screen plate, and a resulting screen plate 10b, in accordance with the present invention. In FIG. 3, there is provided a steel plate 12b, preferably a casting of homogeneous metal, such as AISI 410 or 416 steel. This material may be machined in a "soft" state and then hardened, by heat treatment or the like, to produce a final conventional product.

As previously mentioned, in the description of the invention in the specification and claims, the term "openings" will be used throughout. This term is used for convenience only, and is intended to encompass apertures of all shapes and sizes, including holes, slots, orifices and passageways.

Plate 12b has a thickness "t1" corresponding to the thickness of the resulting screen plate from a first face "f1" to the opposite, second, face "f2" inclusive of the ridges 16b formed integrally with the plate as will become clear from the ensuing description. To fabricate the screen plate, blind openings 20 of a predetermined diameter are formed (e.g. holes are drilled) through first face "f1" of the plate inwardly thereof toward the second face "f2" but which openings 20 terminate a predetermined distance into the plate from the first face "f1" at a point P. Thus, the initial opening formations are essentially a series of blind openings formed at predetermined longitudinal and laterally spaced positions along and into the first face "f1" of the plate. These openings may be considered pilot openings for larger openings 22 which are next formed through the same first face "f1" of the plate. For example, larger diameter holes 22 are likewise drilled a predetermined distance into the plate 12b but terminate at a point P1 short of the termination point of the blind holes 20, i.e., short of the point P.

To provide the through openings for the screen plate or screen cylinder, and hence a plurality of screen openings through the plate, the second face "f2" of plate 12b is machined to form a series of laterally spaced, generally longitudinally extending, parallel grooves 18b having a predetermined lateral extent. The grooves 18b are formed by machining metal from the outer face "f2", leaving a plurality of ridges 16b which likewise are laterally spaced one from the other and extend longitudinally generally parallel one to the other. The machining of plate material between ridges 16b is performed to a depth to uncover the termination points P of the blind openings 20 and thus expose blind openings 20 through the opposite face of the plate in the areas of the grooves 18b. Of course, those blind openings 20 which terminate in the ridges 16b are not exposed. Thus, a plurality of screen openings are formed through the plate, opening in the base portions of the grooves formed by the machining process.

In many screen plates, it is desirable that one side of each ridge 16b bordering an adjacent slot 18b lie generally perpendicular to the face of the plate, for example, as illustrated at 24 in FIG. 3, while the opposite side of each ridge is preferably angled relative to the plate surface, for example, as illustrated at 26 in FIG. 3, and as shown in U.S. Pat. No. 4,529,520, the disclosure of which is hereby incorporated by reference herein. The sloped ridges are often referred to as shaped or angled bars. This angled surface 26 may likewise be formed by machining the ridge 16b along that side to define surface 26. Thus each groove 18b is flanked by a side of a groove defining ridge 16b which side extends perpendicular to the plate face and by a side of the next adjacent ridge 16b defining the opposite side of the groove and which latter side extends at an angle away from the groove. Alternatively, the ridges (bars) 16b may be square or rectangular, with no sloped surface 26.

It will be appreciated that the plate, with the screen openings formed therethrough, may be used in the form of a flat screen plate for the pulp and paper industry. If a cylindrical screen is desired, the plate may be rolled in the form of the screen cylinder, for example, the screen cylinder illustrated in FIG. 1. Cylinders of both the in-flow and out-flow types may be made, with the grooves 18b and ridges 16b on either the inside or outside of the cylinder, and extending generally parallel to the axis of the cylinder. The screen plate, whether flat or in cylindrical form, may be heat-treated in a conventional manner to harden the metal Screens according to the invention have more screen area than prior art screens of the same general type.

Figure 4:
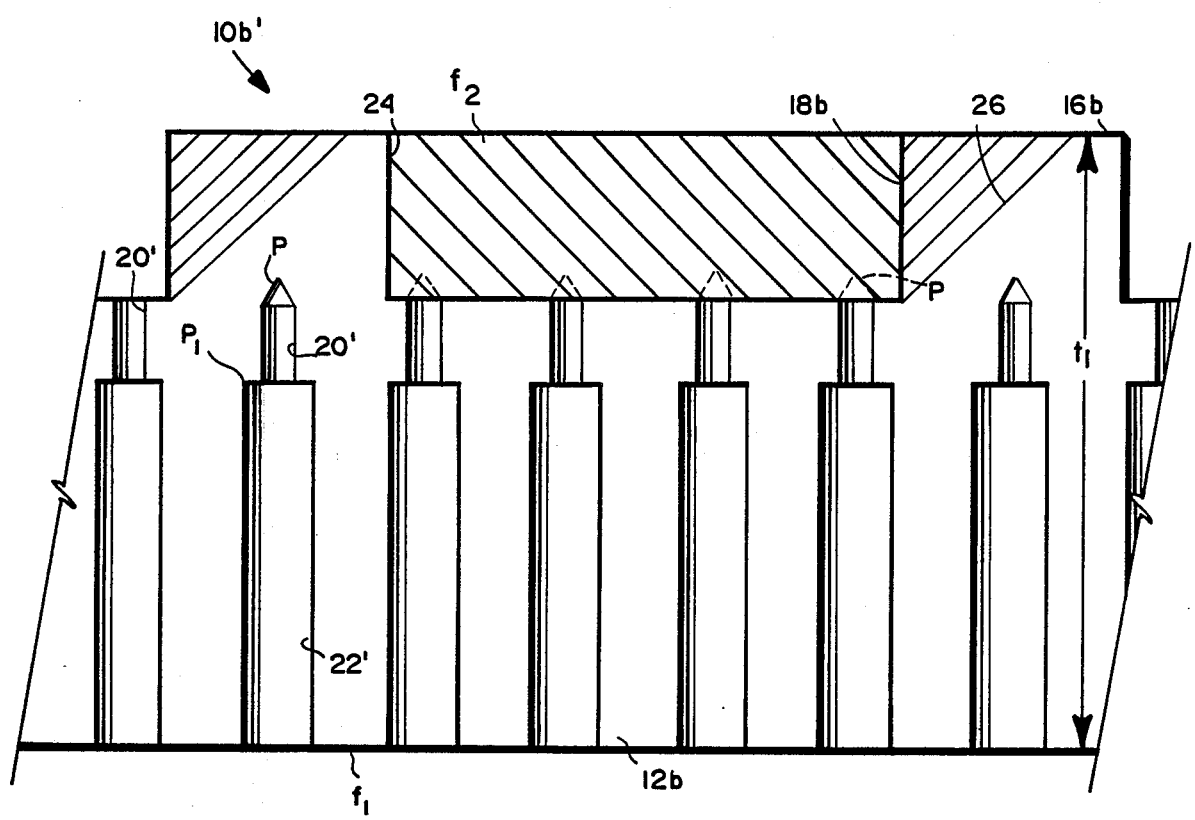
FIG. 4 is a view identical to that of FIG. 3 except that the screen cylinder has slots rather than holes.

FIG. 4 illustrates a structure 10b' identical to that in FIG. 3 except that the openings 20', 22', rather than being holes—as 20, 22 are in the FIG. 3 embodiment—are slots, formed by milling or other conventional manners.

Consequently, by the foregoing described method, fabrication costs and times are substantially reduced in comparison with the prior methods previously described. Additionally, this method enables approximately 40% greater effective screen area than afforded by screen plates manufactured by previous methods. Further, bars (ridges) of any width may be readily constructed, it not being necessary to use only standard configurations of bars as in the prior art. It will also be appreciated that the present manufacturing methods may be applied to other products, such as screw press backing plates and backing plates for filters, both requiring high open areas facing the filtering or screening media. In these applications, the ridges (bars) 16b are square or rectangular in cross-section, and engage and support the filter or screen press apertured element.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of manufacturing a metal screen generally flat plate having first and second opposite faces, comprising the steps of:
    (a) drilling first holes having a first diameter through said first face and into the body of the metal screen plate a predetermined distance to terminate within the plate body at a position P short of said second face;
    (b) drilling second holes of a second diameter, larger than the first diameter, through said first face, generally concentric with said first holes; and
    (c) machining the second face to remove metal material along the majority of the surface thereof to a depth to expose the position P so that the first holes extend entirely through the plate body, and leave the plurality of parallel, substantially continuous ridges in said second face spaced one from the other defining slots therealong after machining is completed.

2. A method according to claim 1 including, subsequent to steps (a) and (b), hardening the metal.

3. A method according to claim 1 including machining the metal to form ridges flat on one side and angled on the opposite side. the further step of drilling holes of larger diameter through the first face than the diameter of the holes at point P and generally concentric therewith.

4. A method according to claim 1 wherein the larger diameter holes terminate short of opening through the plate body between the ridges so that the through holes have a first larger diameter portion through said first face and a second smaller diameter portion extending therefrom and through the opposite side of the plate at locations between said ridges.

5. A method according to claim 1 including the step of forming the plate into a cylindrical shape to form a metal screen cylinder.

6. A method according to claim 5 wherein the first face of said plate body forms an interior surface of said cylinder.

7. A method according to claim 1 including forming the screen plate of metal suitable for hardening processes, and practicing steps (a) through (c) while the metal is in a soft condition; and then after (c) hardening the metal.

8. A method according to claim 1 including, prior to forming the holes and machining the plate, providing a homogeneous plate without welds.

9. A method of manufacturing a metal screen generally flat plate having first and second opposite faces, comprising the steps of:
    (a) forming first openings through said first face and into the body of the screen plate a predetermined distance to terminate within the plate body short of said second face;
    (b) forming second openings through the first face larger than the first openings, and generally concentric therewith; and
    (c) removing material from said second face in longitudinally extending generally parallel rows thereof along the majority of the surface thereof to a depth at least equal to the depth of the plate less said predetermined distance to form a plurality of grooves in said second face so that the openings extend entirely through the plate body and open into said grooves, but leave a plurality of continuous ridges in said second face spaced one from the other on opposite sides of said grooves after material removal is completed.

10. A method according to claim 9 including, subsequent to steps (a) and (b), hardening the metal.

11. A method according to claim 9 including removing material from the ridges to form angled ridge faces adjoining adjacent slots.

12. A method according to claim 9 wherein the openings are holes, the second holes having larger diameter, and wherein the larger diameter holes terminate short of opening through the plate body between the ridges so that the through holes have a first larger diameter portion through said first face and a second smaller diameter portion extending therefrom and through the opposite side of the plate at locations between said ridges.

13. A method according to claim 9 including the step of forming the plate into a cylindrical shape to form a screen cylinder.

14. A method according to claim 13 wherein the first face of said plate body forms an interior surface of said cylinder.

15. A method according to claim 13 wherein the first face of said plate body forms an exterior surface of said cylinder.

16. A method according to claim 9 including forming the screen plate of metal suitable for hardening processes, and practicing steps (a) through (b) while the metal is in a soft condition; and then after step (c) hardening the metal.

* * * * *